United States Patent
Mishra et al.

(10) Patent No.: US 12,039,265 B2
(45) Date of Patent: Jul. 16, 2024

(54) SYSTEMS AND METHODS TO SUPPORT A NEW LOCALE IN A LANGUAGE MODEL

(71) Applicant: Rovi Guides, Inc., San Jose, CA (US)

(72) Inventors: Ajay Kumar Mishra, Karnataka (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 718 days.

(21) Appl. No.: 17/108,549

(22) Filed: Dec. 1, 2020

(65) Prior Publication Data

US 2022/0171929 A1 Jun. 2, 2022

(51) Int. Cl.
*G06F 40/279* (2020.01)
*G06F 16/2455* (2019.01)
*G06F 40/263* (2020.01)
*G06N 20/00* (2019.01)

(52) U.S. Cl.
CPC ........ *G06F 40/279* (2020.01); *G06F 16/2455* (2019.01); *G06F 40/263* (2020.01); *G06N 20/00* (2019.01)

(58) Field of Classification Search
None
See application file for complete search history.

(56) References Cited

U.S. PATENT DOCUMENTS

2014/0108018 A1* 4/2014 Phillips .................. G06F 40/40
704/275
2017/0083829 A1* 3/2017 Kang .................... G06N 3/045

* cited by examiner

*Primary Examiner* — Antim G Shah
(74) *Attorney, Agent, or Firm* — Haley Guiliano LLP

(57) ABSTRACT

Systems and methods are presented herein for generating a new language understanding model, based on a user request. A user may input a root language and a locale into an application for generating a student language model. The application may generate the student language model and may identify a teacher language model related to the student language model. The application may compare data from the identified teacher language model to the student language model. The application may determine a subset of data from the teacher language model is not contained in the student language model. If the application determines at least a subset of data from the teacher language model is not in the student language model, the application may add at least the subset of data from the teacher language model to the student language model.

16 Claims, 7 Drawing Sheets

SYSTEMS AND METHODS TO SUPPORT A NEW LOCALE IN A LANGUAGE MODEL

BACKGROUND

The present disclosure is directed to systems and methods for providing a user with a new language model for a new location, and more particularly, to systems and methods that provide with a new language model for a new location by training a requested student language model with data collected from existing teacher language models.

SUMMARY

When a media device user is consuming content provided by a content platform or an application, the user may desire language settings particular to the location where they are currently located based on a root language the user is familiar with. In one approach, an existing interactive user device may enable a user to create and train a language model, for use in processing documents and media content, with preferences and settings, by inputting data manually for each use case. They user may then be able to implement the language model as a setting for the various media content items and applications associated with their device. This approach is deficient in that the model will take time to train, based on the use cases the user identifies as needing updates within the language model.

In another approach, an existing interactive user device may enable a user to access a natural language model that is trained by incorporating all associated or like language models related to a root language model that a student language model is associated with. The approach is deficient in that the model size grows proportionately based on the size of the teacher model absorbed. Additionally, the method of training may incorporate large pools of data that do not address nuances for a particular locale that the student model was generated to address. The approach is unsuitable to use in low memory devices, such as mobile phones, and would be limited in terms of when and through which interface the model can be updated. Additionally, this method often leads to pools of data that do not train the student model in a manner that addresses the nuances of the locale that the language model was requested for.

These deficiencies are solved by the systems and methods described herein, which utilize a language update application, comprised of input/output circuitry, control circuitry, and algorithms encoded thereon, that generate a student language model, based on parameters provided by a user which include a location and a root language, that is conditionally updated based on an analysis conducted by the application that determines if new data detected will reduce the training time of the student language model. A request to generate a student language model is received, wherein the request identifies a source language and a location that the language model will be associated with. In response, a teacher language model, available on a server through various communication channels or local storage, is identified, wherein the teacher language model is comprised of data related to the student language model. The data available in the teacher language model is then compared to the data currently comprising the student language model. In response to determining the data in the student language model does not contain the subset of data in the teacher language model, the student language model is updated with the plurality of data in the teacher language.

This approach addresses the deficiencies in the discussed approaches in that it does not rely on a user's inputs to the student model to train the student model to be more complete or useful to the user. Additionally, this approach relies on a comparison of data available in already trained models to determine if the trained models contain information useful to the student model before initiating an update to the student model. This addresses the issue of trying to create a learning language model for a device with limited processing or memory by ensuring only updates that improve the model's usefulness are downloaded.

In some embodiments, a comparison of teacher language model data to the student language model data may be performed utilizing a loss calculation to determine if that teacher language model can reduce the amount of training time the student model would need to learn the content available in the teacher language model.

In some embodiments, the location of the user may be determined. The current location of the user may be compared to a plurality of locations where the user has accessed the device. If it is determined that the user is in a location that is not in the activity history of the user, a request for a student language model based on the user's current selected language and the user's current location may be automatically generated if enabled in a user profile preference.

In some embodiments, a plurality of media content items may be available to the user through various platforms and servers accessible through a device. The plurality of media content items may not have language tags that match the language and location identified in the student language model. A search may be conducted to find media content items, or data embedded in media content items, that include language tags associated with the student language model.

In some embodiments, a probability score may be used to compare the data of the teacher language model to the data of the student language model. The probability score may be compared to a threshold. The probability score may be a loss calculation that determines the student language model training time will be reduced if the data of the teacher language model is added to the data of the student language model.

In some embodiments, a notification is generated to provide a user with an indication that, when selected, may enable the system to start the download of updated data for the student language model. In some embodiments, the data may be from a related teacher language model. In some embodiments, the data may be an update related to a particular application or a particular media content item to enable updates to user language preferences on a user device.

BRIEF DESCRIPTIONS OF THE DRAWINGS

The above and other objects and advantages of the disclosure may be apparent upon consideration of the following detailed description, taken in conjunction with the accompanying drawings, in which.

Figure 6:
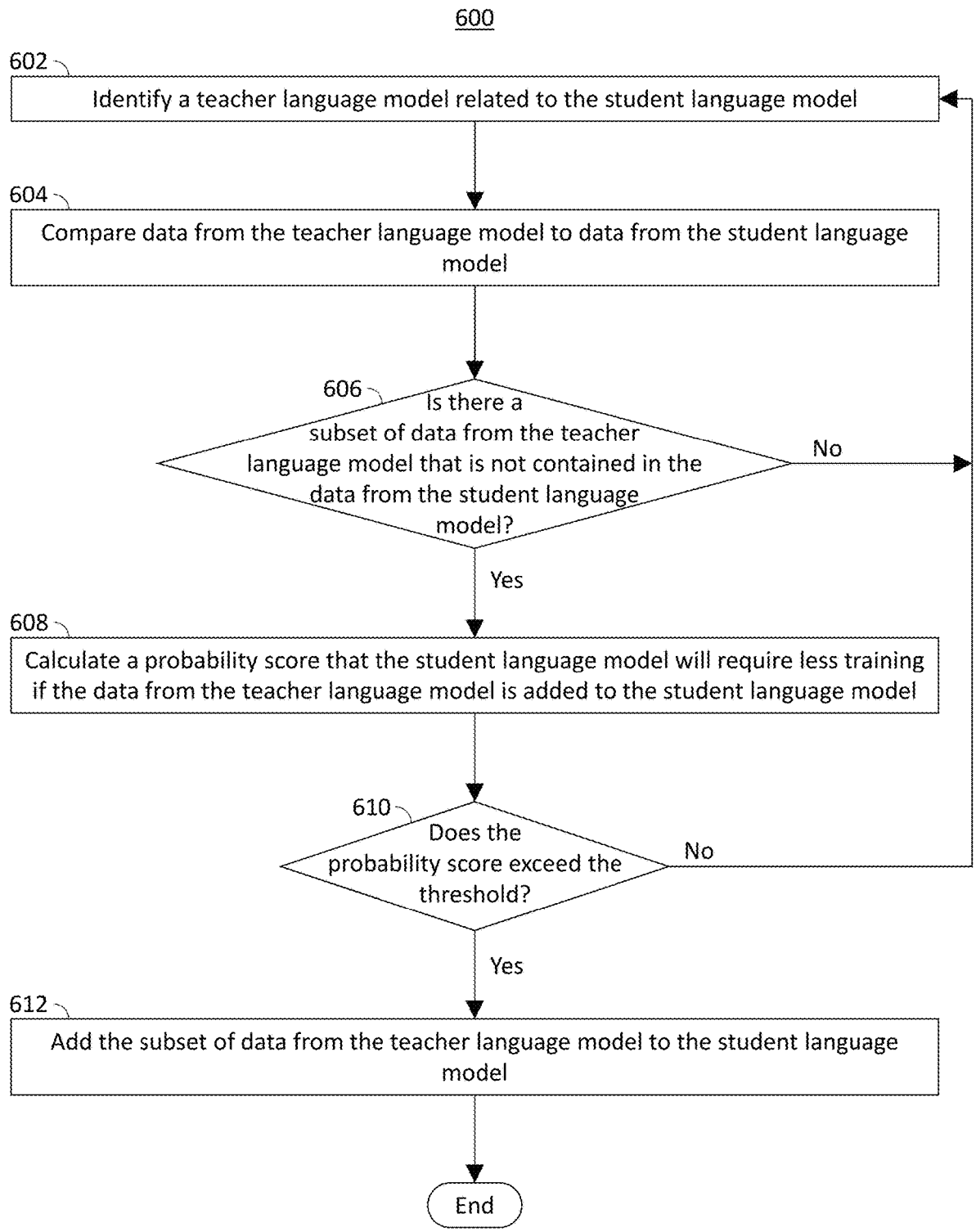
Figure 7:
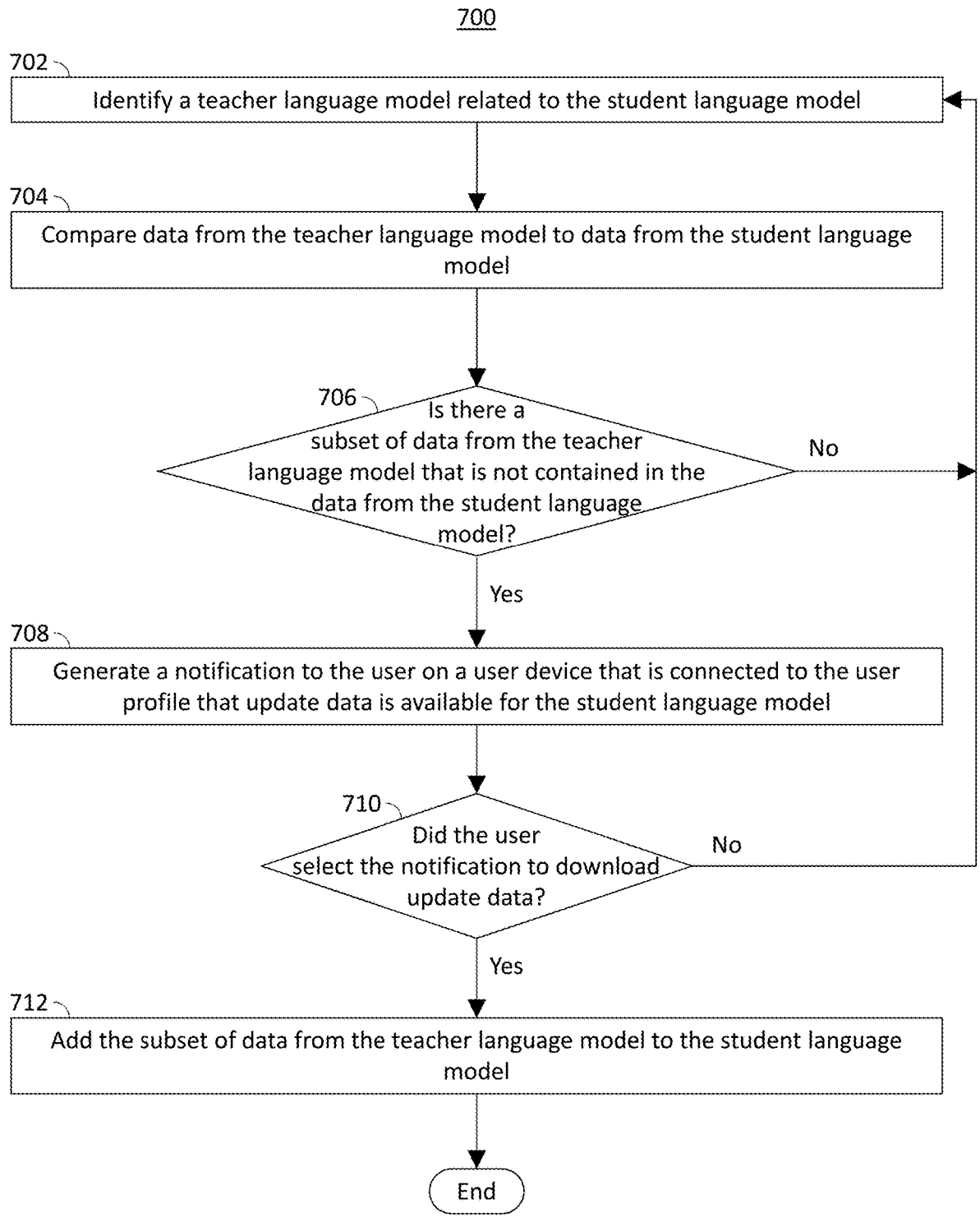

FIG. 6 is a flowchart representing an illustrative process for comparing a probability score to a threshold to determine if the data of an identified teacher language model should be downloaded to a student language model, in accordance with some disclosed methods and embodiments; and FIG. 7 is a flowchart representing an illustrative process for generating a notification to the user indicating there is data available to download to update the student language model, in accordance with some disclosed methods and embodiments.

DETAILED DESCRIPTION

Methods and systems are provided herein for providing a user with a new language model for a new location based on a user request to create a student language model and a user request to have the student language model trained by accessible data.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random-access memory (RAM), etc.

Figure 1:
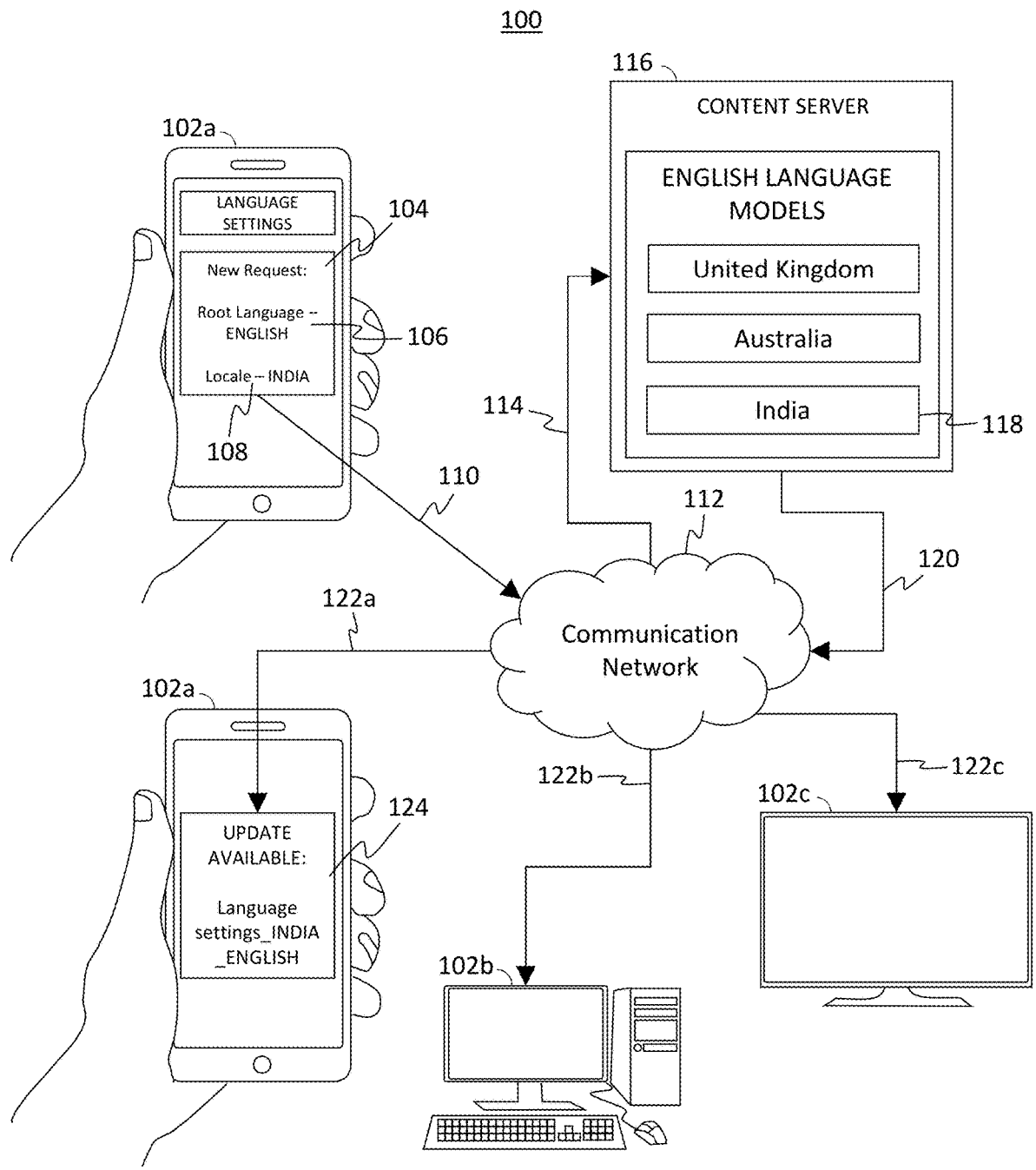
FIG. 1 illustrates an example of an interactive audio/video system for receiving a user request to generate a student language model, in accordance with some embodiments of the disclosure.

FIG. 1 depicts exemplary interactive audio/video system 100 for receiving a user request to generate a student language model. Interactive audio/video system 100 may include audio outputs, an interactive video display, interactive menus, a microphone for recording a user's commands for the system, and a device or interactive user interface, which would allow the user to input text into a field in an interactive interface to provide a command to a language model application encoded onto interactive audio/video system 100. In some embodiments, a user may have multiple devices (e.g., request devices 102a-c) connected by a user profile over a communication network to create interactive audio/video system 100. The user may access an interactive menu of language settings at request device 102a. Interactive audio/video system 100 also incorporates a plurality of request devices including request device 102a (e.g., request device 102b which may be a computer and request device 102c which may be a Smart TV). The user may generate new language model request 104 using request device 102a (e.g., a request for a language model that is based on the root language English, as utilized in the location India). The request may be generated at any of request devices 102a-c or any device the user is connected to through a user profile.

In some embodiments, new language model request 104 may include parameters that include root language 106 and locale 108 (e.g., root language "English" and location "India"). In some embodiments, the language model application may utilize root language 106 and locale 108 to formulate a search query for language models available through request device 102a. The search query may be generated by the application through any method available to one skilled in the art. The search query generated may utilize root language 106 and locale 108 to seek out language models that may contain data which would reduce the training time of the student language model generated from new language model request 104. In some embodiments, request device 102a may be connected, via communication path 110, to communication network 112. In some embodiments, the language model application may use communication path 110 to connect to communication network 112, which may connect to content server 116 by communication path 114. In some embodiments, request device 102a may send the generated search query through communication path 110 into communication network 112, which may forward the search query to content server 116 through communication path 114.

In some embodiments, the application may determine content server 116 is accessible to request device 102a through communication network 112. In some embodiments, the application may utilize root language 106 and locale 108 to find language models that may contain data that would reduce the training time of the student language model generated from new language model request 104 (e.g., language models available on content server 116 related to the root language English and/or the location India). The application may find teacher language model 118 on content server 116 (e.g., utilizing computing device 202 from FIG. 2 to access content server 116 through communication network 208, or utilizing computing device 300 from FIG. 3 to access content server 302 through communication network 306, where for either example the server responds to a query generated by the exemplary computing device by providing access to candidate teacher models). In some embodiments, teacher language model 118 may include at least one or both of root language 106 and locale 108 as descriptive terms related to the data included in teacher language model 118 (e.g., English language models for different locations may be identified, but the target teacher language model may include descriptive data indicating it contains data for the English language as it is used in India). The application may compare the data included in teacher language model 118 to currently available data in the student language model generated from new language model request 104. The application may determine through the comparison that teacher language model 118 does not add new data to the student language model generated from new language model request 104 and the application may not queue teacher language model 118 for download onto request device 102a. Based on the comparing, the application may determine that only a portion of the data from teacher language model 118 is new data to the student language model generated from new language model request 104. In this example, the application may queue for download only the portion of teacher language model 118 that is not already available in the student language model generated from new language model request 104.

The application may request the data be transmitted from content server 116 through communication path 120 back to communication network 112. In some embodiments, the application may provide notification 124 to the user on request device 102a that an update is available for the student language model generated from new language model request 104, which may include teacher language model 118. In some embodiments, the application may download teacher language model 118 after selecting notification 124 on device 102*a*. The downloaded update may become available to the plurality of request devices connected by a user profile over communication network 112 (e.g., request device 102*b* which may be a computer, and request device 102*c* which may be a Smart TV).

Figure 2:
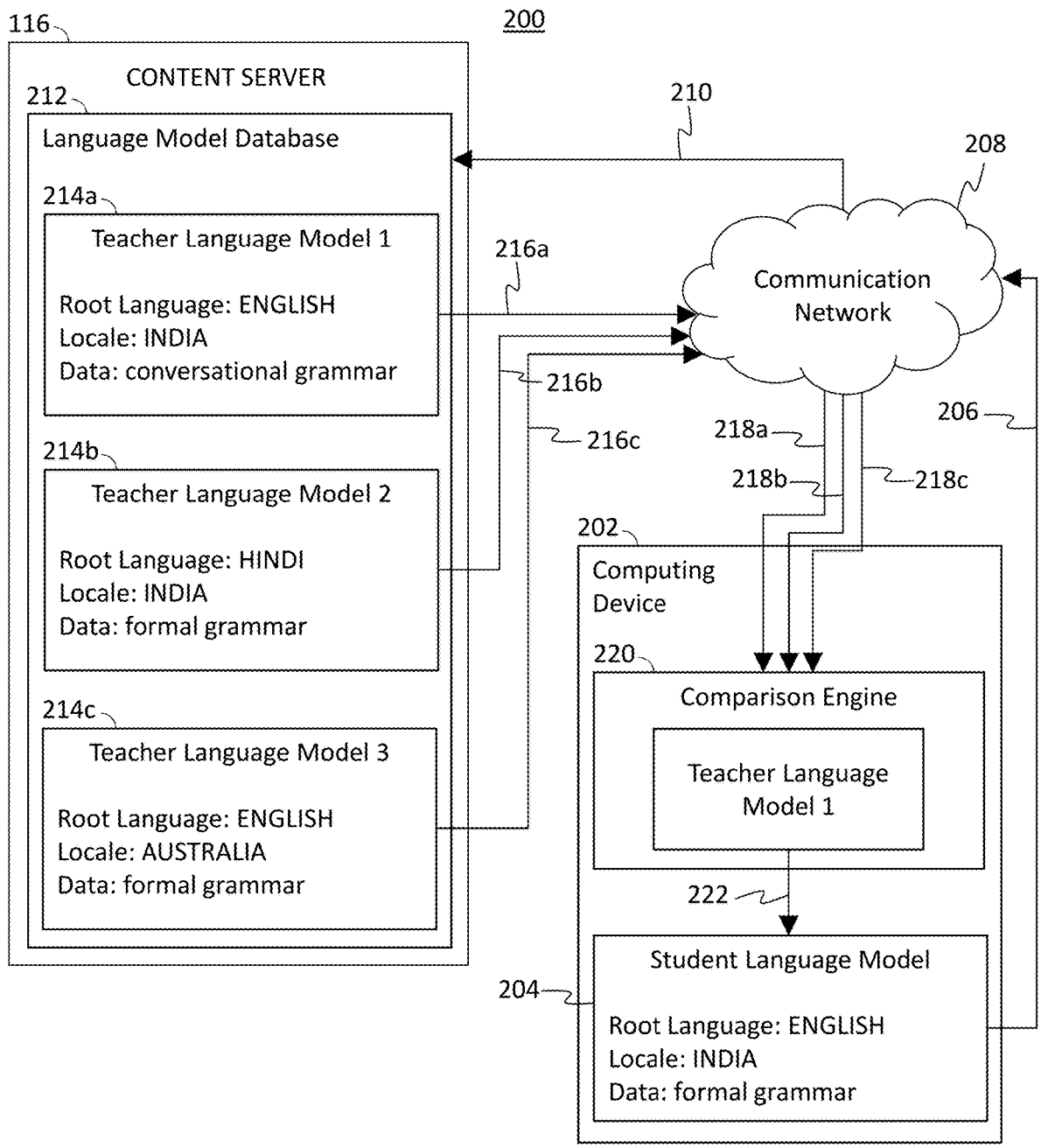
FIG. 2 illustrates an example of analyzing and conducting searches based on elements of a request to generate a student language model, in accordance with some embodiments of the disclosure.

FIG. 2 illustrates an example of analyzing and conducting searches based on elements of a request to generate a student language model, in accordance with some embodiments of the disclosure. The application may determine student language model 204 was generated through interactive audio/video system 100 from FIG. 1, which is represented by computing device 202. Computing device 202 may represent any single device or a plurality of devices, such as request devices 102*a-c* of FIG. 1, that are connected by a communication network (e.g., communication network 112 of FIG. 1, communication network 208 of FIG. 2, or communication network 306 of FIG. 3). Computing device 202 may also be represented by computing device 300 of FIG. 3 and may be modified by one skilled in the art to be capable of receiving a user request to generate student language model 204 and may also be modified to search for updates to the data available in student language model 204, either through local storage or through storage found on content servers connected to computing device 202 through any of the aforementioned exemplary communication networks.

The application, which may be encoded onto computing device 202, may determine student language model 204 includes parameters such as a root language and a locale (e.g., a root language "English" and a locale "India"), as well as an existing set of data (e.g., formal grammar data based on how the root language is used in the locale). The application may determine that computing device 202 may communicate with communication network 208 through communication path 206. The application may generate a search query to be sent through communication path 206 to communication network 208 (e.g., a query for language model data available based on a root language "English" and a locale "India). The application may determine content server 116 is available through communication path 210 and may provide the query for language model data to content server 116. Content server 116 may be language model database 212, which may store a plurality of language models. The application may determine there are multiple language models that contain descriptive data related to student language model 204. The application may identify teacher language models 214*a-c* which contain data related to the root language of student language model 204 (e.g., English), the locale (e.g., India), or both. The application may also identify the type of data on each of teacher language models 214*a-c* (e.g., conversational grammar and formal grammar).

The application may request the descriptive data associated with each of teacher language models 214*a-c* through communication paths 216*a-c* to back to communication network 208. The application may download, using communication network 208, the descriptive data associated with each of teacher language models 214*a-c* through communication paths 218*a-c* to comparison engine 220. Comparison engine 220 may be an aspect of the application encoded onto computing device 202 for determining which of teacher language models 214*a-c* identified from the query reduces the required training time of student language model 204 the most. In some embodiments, comparison engine 220 may compare the descriptive data from any of teacher language models 214*a-c* to student language model 204 (e.g., respective root languages, respective locales, and respective data descriptions such as "formal grammar" and "conversational grammar"). In some embodiments, the application may use comparison engine 220 to analyze the content of the data of each of teacher language models 214*a-c* as being substantively different from the data of student language model 204. In some embodiments, comparison engine 220 may consider the content of data of each of teacher language models 214*a-c* and the data of student language model 204 as part of a loss calculation. In some embodiments, the loss calculation may be a calculation of training time student language model 204 would need to create the data available in any of teacher language models 214*a-c* to enable a more useful language model for the user.

In some embodiments, comparison engine 220 may determine that only one of teacher language models 214*a-c* includes data that complement the data present in student language model 204 (e.g., teacher language model 214*a* comprised of data related to conversation grammar for English as it is used in India is considered complementary, whereas teacher language model 214*b* comprised of data related to formal grammar for Hindi as it is used in India and teacher language model 214*c* comprised of data related to formal grammar for English as it is used in Australia are not considered complementary). In some embodiments, comparison engine 220 may queue a download of the portions of the complementary teacher language model through communication path 222 to student language model 204 (e.g., queue for download teacher language model 214*a*). In some embodiments, the download may require a user selection of an indication, such as notification 124 from FIG. 1.

Figure 3:
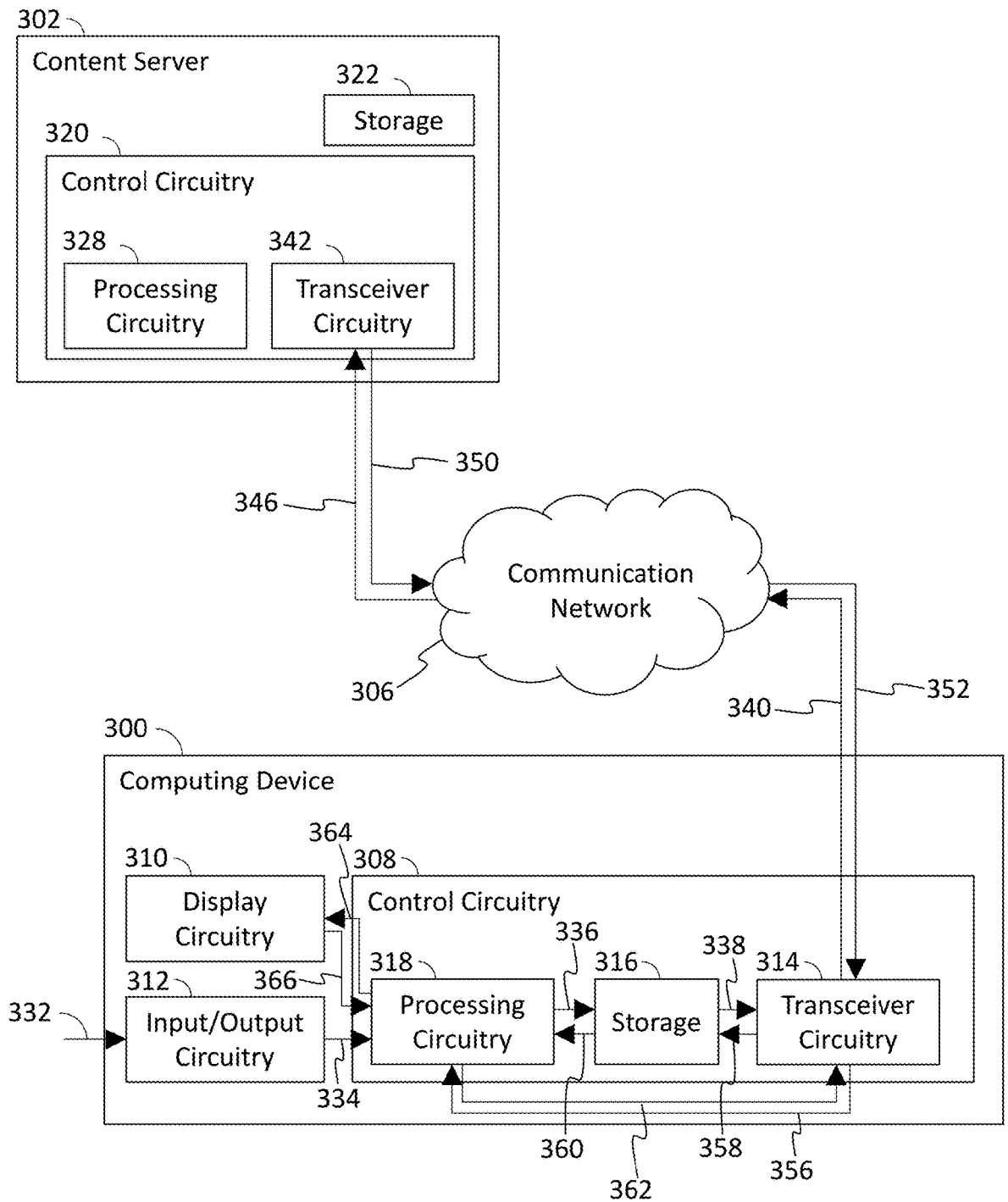
FIG. 3 is a block diagram representing devices, components of each device, and data flow therebetween for an interactive audio/video system for generating a student language model and updating language settings, in accordance with some embodiments of the disclosure.

FIG. 3 is a block diagram representing devices, components of each device, and data flow therebetween for an interactive audio/video system for generating a student language model and updating language settings, in accordance with some embodiments of the disclosure;

FIG. 3 is an illustrative block diagram showing an interactive audio/video system for providing a user with a new language model for a new location based on a user request to create a student language model and a user request to have the student language model trained by accessible data, in accordance with some embodiments of the disclosure. In some embodiments, one or more parts of or the entirety of the interactive system may be configured as a system implementing various features, processes, and components of FIGS. 1, 2, and 4-7. Although FIG. 3 shows a certain number of components, in various examples, the interactive system may include fewer than the illustrated number of components and/or multiples of one or more of the illustrated number of components.

The interactive system is shown to include computing device 300, content server 302, and a communication network 306. It is understood that while a single instance of a component may be shown and described relative to FIG. 3, additional instances of the component may be employed. For example, content server 302 may include, or may be incorporated in, more than one server. Similarly, communication network 306 may include, or may be incorporated in, more than one communication network. Content server 302 is shown as communicatively coupled to computing device 300 through communication network 306. While not shown in FIG. 3, content server 302 may be directly communicatively coupled to computing device 300, for example, in a system absent or bypassing communication network 306.

Communication network 306 may comprise one or more network systems, such as, without limitation, Internet, LAN, WiFi or other network systems suitable for audio processing applications. In some embodiments, the system of FIG. 3 excludes content server 302, and functionality that would otherwise be implemented by content server 302 is instead implemented by other components of the system depicted in FIG. 3, such as one or more components of communication network 306. In still other embodiments, content server 302 works in conjunction with one or more components of communication network 306 to implement certain functionality described herein in a distributed or cooperative manner. Similarly, in some embodiments, the system depicted by FIG. 3 excludes computing device 300, and functionality that would otherwise be implemented by computing device 300 is instead implemented by other components of the system depicted by FIG. 3, such as one or more components of communication network 306, content server 302 or a combination of the same. In other embodiments, computing device 300 works in conjunction with one or more components of communication network 306 or content server 302 to implement certain functionality described herein in a distributed or cooperative manner.

Computing device 300 includes control circuitry 308, display circuitry 310 and input/output circuitry 312. Control circuitry 308 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 308 in turn includes transceiver circuitry 314, storage 316 and processing circuitry 318. In some embodiments, computing device 300 or control circuitry 308 may be configured as varying embodiments of interactive audio/video system 100 from FIG. 1.

In addition to control circuitry 308, and 320, computing device 300, and content server 302 may each include storage (storage 316 and storage 322, respectively). Each of storages 316 and 322 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 316, 322 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 316, 322, or instead of storages 316, 322. In some embodiments, the audio portion of a conference between multiple participants may be recorded and stored in one or more of storages 316, 322.

In some embodiments, control circuitry 320 and/or 308 executes instructions for an application stored in memory (e.g., storage 322 and/or storage 316). Specifically, control circuitry 320 and/or 308 may be instructed by the application to perform the functions discussed herein. In some implementations, any action performed by control circuitry 320 and/or 308 may be based on instructions received from the application. For example, the application may be implemented as software or a set of executable instructions that may be stored in storage 322 and/or 316 and executed by control circuitry 320 and/or 308. In some embodiments, the application may be a client/server application where only a client application resides on computing device 300, and a server application resides on content server 302.

The application may be implemented using any suitable architecture. For example, it may be a stand-alone application wholly implemented on computing device 300. In such an approach, instructions for the application are stored locally (e.g., in storage 316), and data for use by the application is downloaded on a periodic basis (e.g., from an out-of-band feed, from an Internet resource, or using another suitable approach). Control circuitry 308 may retrieve instructions for the application from storage 316 and process the instructions to perform the functionality described herein. Based on the processed instructions, control circuitry 308 may determine a type of action to perform in response to input received from input/output circuitry 312 or from communication network 306. For example, in response to a user providing a statement as part of a conversation with a plurality of users, control circuitry 308 may perform the steps of process 400 (FIG. 4), process 500 (FIG. 5), process 600 (FIG. 6), process 700 (FIG. 7), or processes relative to various embodiments.

In client/server-based embodiments, control circuitry 308 may include communication circuitry suitable for communicating with an application server (e.g., content server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 306). In another example of a client/server-based application, control circuitry 308 runs a web browser that interprets web pages provided by a remote server (e.g., content server 302). For example, the remote server may store the instructions for the application in a storage device. The remote server may process the stored instructions using circuitry (e.g., control circuitry 308) and/or generate displays. Computing device 300 may receive the displays generated by the remote server and may display the content of the displays locally via display circuitry 310. This way, the processing of the instructions is performed remotely (e.g., by content server 302) while the resulting displays, such as the display windows described elsewhere herein, are provided locally on computing device 300. Computing device 300 may receive inputs from the user via input/output circuitry 312 and transmit those inputs to the remote server for processing and generating the corresponding displays. Alternatively, computing device 300 may receive inputs from the user via input/output circuitry 312 and process and display the received inputs locally, by control circuitry 308 and display circuitry 310, respectively.

Content server 302 and computing device 300 may transmit and receive content and data such as media content via communication network 306. For example, content server 302 may be a media content provider, and computing device 300 may be a smart television configured to download or stream media content, such as a live news broadcast, from content server 302. Control circuitry 320, 308 may send and receive commands, requests, and other suitable data through communication network 306 using transceiver circuitry 342, 314, respectively. Alternatively, control circuitry 320, 308 may communicate directly with each other using transceiver circuitry 342, 314, respectively, avoiding communication network 306.

It is understood that computing device 300 is not limited to the embodiments and methods shown and described herein. In nonlimiting examples, computing device 300 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Computing device 300 receives user input 332 at input/output circuitry 312. For example, computing device 300 may receive a user input such as a user swipe or user touch. In some embodiments, computing device 300 is a media device (or player) configured as interactive audio/video system 100 from FIG. 1, with the capability to access media content.

User input 332 may be received from a user selection-capturing interface that is separate from device 302, such as a remote-control device, trackpad or any other suitable user movement-sensitive or capture devices, or as part of device 302, such as a touchscreen of display circuitry 310. Transmission of user input 332 to computing device 300 may be accomplished using a wired connection, such as an audio cable, USB cable, ethernet cable or the like attached to a corresponding input port at a local device, or may be accomplished using a wireless connection, such as Bluetooth, WiFi, WiMAX, GSM, UTMS, CDMA, TDMA, 3G, 4G, 4G LTE, 5G, or any other suitable wireless transmission protocol. Input/output circuitry 312 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WiFi, WiMAX, GSM, UTMS, CDMA, TDMA, 3G, 4G, 4G LTE, 5G, or other wireless transmission protocols.

Processing circuitry 318 may receive user input 332 from input/output circuitry 312 using communication path 334. Processing circuitry 318 may convert or translate the received user input 332 that may be in the form of gestures or movement to digital signals. In some embodiments, input/output circuitry 312 performs the translation to digital signals. In some embodiments, processing circuitry 318 (or processing circuitry 328, as the case may be) carries out disclosed processes and methods. For example, processing circuitry 318 or processing circuitry 328 may perform any of embodiments 100, 200, and 400-700, of FIGS. 1, 2, and 4-7, respectively.

Processing circuitry 318 may provide requests to storage 316 by communication path 336. Storage 316 may provide requested information to processing circuitry 318 by communication path 360. Storage 316 may transfer a request for information to transceiver circuitry 314 which may translate or encode the request for information to a format receivable by communication network 306 before transferring the request for information by communication path 338. Communication network 306 may forward the translated or encoded request for information to transceiver circuitry 342 by communication path 346.

At transceiver circuitry 342, the translated or encoded request for information, received through communication path 346, is translated or decoded for processing circuitry 328, which will provide a response to the request for information based on information available through control circuitry 320 or storage 322, or a combination thereof. The response to the request for information is then provided back to communication network 306 by communication path 350 in an encoded or translated format such that communication network 306 can forward the encoded or translated response back to transceiver circuitry 314 by communication path 352.

At transceiver circuitry 314, the encoded or translated response to the request for information may be provided directly back to processing circuitry 318 by communication path 356, or may be provided to storage 316 through communication path 358, which then provides the information to processing circuitry 318 by communication path 360. Processing circuitry 318 may also provide a request for information directly to transceiver circuitry 314 through communication path 362, where storage 316 responds to an information request, provided through communication 336, by communication path 360 that storage 316 does not contain information pertaining to the request from processing circuitry 318.

Processing circuitry 318 may process the response to the request received through communication paths 356 or 360 and may provide instructions to display circuitry 310 for a notification to be provided to the users through communication path 364. Display circuitry 310 may incorporate a timer for providing the notification or may rely on inputs through input/output circuitry 312 from the user, which are forwarded from processing circuitry 318 through communication path 364, to determine for how long or in what format to provide the notification. When display circuitry 310 determines the display has been completed, a notification may be provided to processing circuitry 318 through communication path 366.

The communication paths provided in FIG. 3 between computing device 300, content server 302, communication network 306, and all subcomponents depicted are exemplary and may be modified to reduce processing time or enhance processing capabilities for each step in the processes disclosed herein by one skilled in the art.

Figure 4:
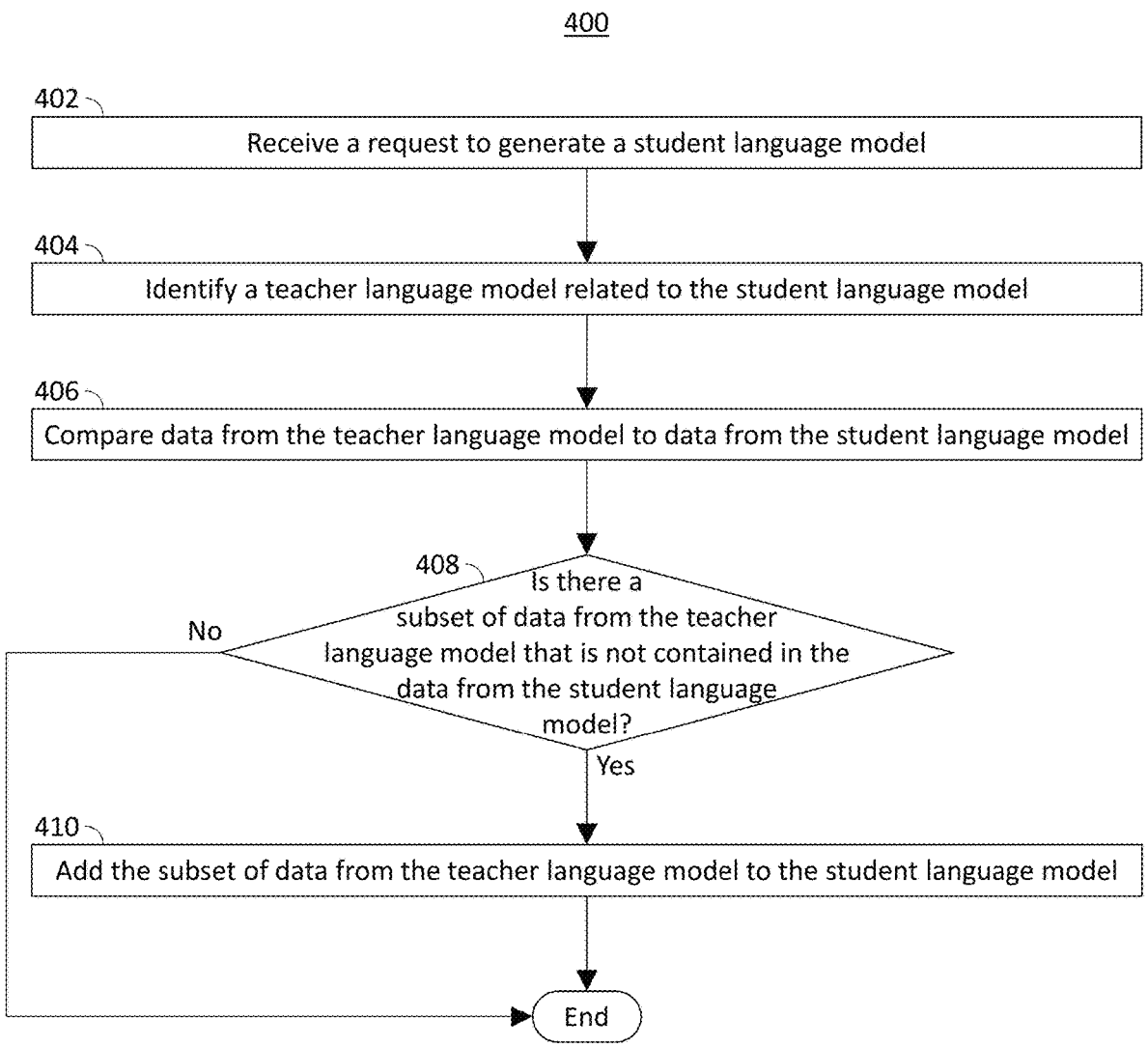
FIG. 4 is a flowchart representing an illustrative process for determining a user's location and generating a request to generate a student language model based on the request, in accordance with some disclosed methods and embodiments.

FIG. 4 is a flowchart representing illustrative process 400 for determining a user's location and generating a request to generate a student language model based on the request, in accordance with some disclosed methods and embodiments. It should be noted that process 400 depicted in FIG. 4 or any step thereof could be performed on, or provided by, any device shown in FIG. 3 and can incorporate various user interfaces (e.g., display circuitry 310 of FIG. 3). For example, process 400 depicted in FIG. 4 may be executed by control circuitry 308 (FIG. 3) of the user equipment exemplified by computing device 300. In addition, one or more steps of process 400 depicted in FIG. 4 may be incorporated into or combined with one or more steps of any other process or embodiment (e.g., starting at process block 502 in process 500 of FIG. 5, starting at process block 602 in process 600 of FIG. 6, starting at process block 702 in process 700 of FIG. 7). In addition, FIG. 1 and FIG. 2 provide depictions of exemplary embodiments of the processes described herein.

At 402, control circuitry 308 may receive a request to generate a student language model. In some embodiments, the request may be received as a spoken word from a user. For example, input/output circuitry 312 may include a microphone or other component to directly capture audio information. Alternatively, or additionally, computing device 300 may receive from another device a, via transceiver circuitry 314, data representing a voice input captured from the user. In other embodiments, the request may be entered by the user through an interactive menu (e.g., a device settings menu). The request may comprise a target language and a locale for which additional language data is requested. In some embodiments, control circuitry 308 may determine a user is in a particular location and may identify a language commonly used. For example, computing device 300 may include a GPS receiver or other component which communicates the current location of computing device 300 to control circuitry 308. In some embodiments, control circuitry 308 may determine a user's location and a user's current language settings associated with a user device profile and may recommend generating a related student language model based on what is used in the area and is related to the user's current language settings.

At 404, control circuitry 308 may identify a teacher language model related to the student language model. In some embodiments, control circuitry 308 may accomplish this using any of the devices and exemplary processes depicted in FIGS. 1-3. The teacher language model may be stored in local storage on the device where the request for the student language model was generated or the request may be stored on a content server accessible through a communication network. The teacher language model may also be a media content item, which may incorporate language data related to the root language and locale of the original request. At 406, control circuitry 308 may compare data from the teacher language model to data from the student language model. In some embodiments, this may be accomplished through comparison engine 220 of FIG. 2, which may utilize the comparison logic associated with FIG. 6. In some embodiments, the comparison may be performed on the device where the request for the student language model originated from. In some embodiments, the comparison may be performed utilizing the control circuitry of any of the devices connected to the communication network utilizing the user profile as depicted in FIG. 1.

At 408, control circuitry 308 may determine whether there is a subset of data from the teacher language model that is not contained in the data of the student language model. In some embodiments, this may be accomplished by reviewing results generated through comparison engine 220 of FIG. 2, which may utilize the comparison logic associated with FIG. 6. It should be noted that actions 406 and 408 may be accomplished by any means considered by one skilled in the art such that these actions may be executed on devices of varying processing capabilities or to streamline the processing required to identify data from a teacher language model to incorporate into a student language model. If there is a subset of data from the teacher language model that is not contained in the student language model ("Yes" at 408), then, at 410, control circuitry 308 may add the subset of data from the teacher language model to the student language model. In some embodiments, control circuitry 308 may provide notification 124 from FIG. 1 to inform a user that more data for the model is available. In some embodiments, control circuitry 308 may require the user to interact with notification 124 to accept the download of data. In some embodiments, the download may occur based on user profile settings that permit passive download of the new data. It should be noted that action 410 may be accomplished by any means considered by one skilled in the art such that the processing power required to add the data from the teacher language model to the student language model is optimized. In some embodiments, the notification may appear on any of the devices connected to the communication network using the user profile as depicted in FIG. 1, depending on which device the user may be active on. In some embodiments, the update is downloaded to all devices after user interaction with the notification. In some embodiments, the update is queued for download on each connected device, and the user must log in to each device and enable the download on each connected device. In some embodiments, the determination on whether a download is automatic or queued for user permission may be contingent on the availability of local storage as depicted in exemplary computing device 300 of FIG. 3.

Figure 5:
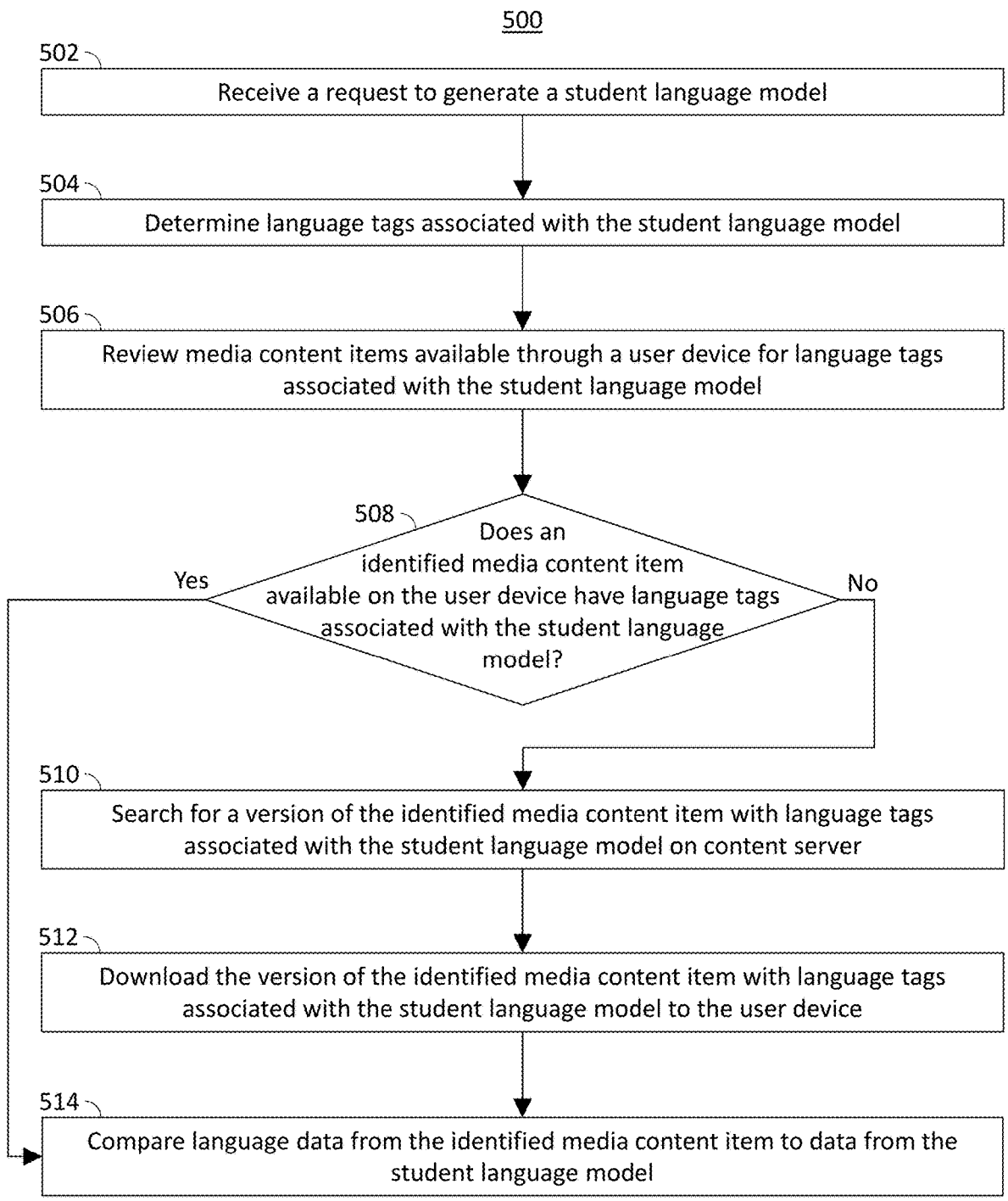
FIG. 5 is a flowchart representing an illustrative process for using language tags to search for media content items that incorporate elements of the student language model, in accordance with some disclosed methods and embodiments.

FIG. 5 is a flowchart representing illustrative process 500 for using language tags to search for media content items that incorporate elements of the student language model, in accordance with some disclosed methods and embodiments. It should be noted that process 500 depicted in FIG. 5 or any step thereof could be performed on, or provided by, any device shown in FIG. 3 and can incorporate various user interfaces (e.g., display circuitry 310 of FIG. 3). For example, process 500 depicted in FIG. 5 may be executed by control circuitry 308 (FIG. 3) of user equipment exemplified by computing device 300. In addition, one or more steps of process 500 depicted in FIG. 5 may be incorporated into or combined with one or more steps of any other process or embodiment (e.g., starting at process block 402 in process 400 of FIG. 4, starting at process block 602 in process 600 of FIG. 6, starting at process block 702 in process 700 of FIG. 7). In addition, FIG. 1 and FIG. 2 provide depictions of exemplary embodiments of the processes described herein.

At 502, control circuitry 308 may receive a request to generate a student language model. In some embodiments, control circuitry 308 may utilize any of the means of receiving a request as described for process block 402 from process 400 in FIG. 4. At 504, control circuitry 308 may determine language tags associated with the student language model. In some embodiments, the language tags may include data tags such as a root language and a location (e.g., root language 106 and locale 108 from FIG. 1). In some embodiments, control circuitry 308 is capable of accessing data associated with a plurality of applications, servers, media assets, media content items, or other data files to determine if there is any form of data related to the language tags associated with the student language model generated. At 506, the control circuitry 308 may review media content items available, through the user device used to generate the student language model (e.g., any of the computing devices depicted in FIGS. 1-3), for language tags embedded in the data associated with the media content items that are related to the student language model. In some embodiments, the language tags may be found in any form of metadata associated with the identified media content items. In some embodiments, the media content items may be stored on a separate server that the media device, on which the application is loaded, may access through a wireless connection.

If control circuitry 308 determines an identified media content item available on the user device has language tags associated with the student language model ("Yes" at 508), control circuitry 308 may compare language data from the identified media content item to data from the student language model at 514. In some embodiments, control circuitry 308 may update the student language model using patterns and other language use information from media content items that utilize the language in the specified locale. In some embodiments, control circuitry 308 may train the student language model based on information available on media content items accessible through connections made by the user device on which the student language model was generated to increase the amount of training the model experiences by continuously seeking new data.

If control circuitry 308 determines an identified media content item available on the user device does not have language tags associated with the student language model ("No" at 508), control circuitry 308 may search for a version of the identified media content item that contains language tags associated with the student language model on a content server at 510 (e.g., content server 302 from FIG. 3). At 512, control circuitry 308 may download a version of the identified media content item with language tags associated with the student language model to the user device. At 514, control circuitry 308 may compare language data from the identified media content item to data from the student language model. In some embodiments, control circuitry 308 may update the student language model using patterns and other language use information from media content items that utilize the language in the specified locale. In some embodiments, control circuitry 308 may train the student language model based on information available on media content items accessible through connections made by the user device on which the student language model was generated to increase the amount of training the model experiences by continuously seeking new data.

FIG. 6 is a flowchart representing illustrative process 600 for comparing a probability score to a threshold to determine if the data of an identified teacher language model should be downloaded to a student language model, in accordance with some disclosed methods and embodiments. It should be noted that process 600 depicted in FIG. 6 or any step thereof could be performed on, or provided by, any device shown in FIG. 3 and can incorporate various user interfaces (e.g., display circuitry 310 of FIG. 3). For example, process 600 depicted in FIG. 6 may be executed by control circuitry 308 (FIG. 3) of user equipment exemplified by computing device 300. In addition, one or more steps of process 600 depicted in FIG. 6 may be incorporated into or combined with one or more steps of any other process or embodiment (e.g., starting at process block 404 in process 400 of FIG. 4, starting at process block 514 in process 500 of FIG. 5, starting at process block 702 in process 700 of FIG. 7). In addition, FIG. 1 and FIG. 2 provide depictions of exemplary embodiments of the processes described herein.

At 602, control circuitry 308 may identify a teacher language model related to the student language model. In some embodiments, control circuitry 308 may identify a media content item to compare data to the student language model. In some embodiments, control circuitry 308 may access a teacher language model or a media content item using any of the devices or processes depicted in FIGS. 1-3. At 604, control circuitry 308 may compare data from the teacher language model to data form the student language model. In some embodiments, the comparison may include a review of tags or other descriptive data (e.g., the teacher language model contains data related to conversational grammar, whereas the student language model contains data related to formal grammar as depicted in FIG. 2). The preliminary comparison of data at 604 may occur by any format considered by one skilled in the art to enable control circuitry 308 to be used by a plurality of devices with a plurality of processing and storage capabilities.

If control circuitry 308 determines that all of the data from the teacher language model is already contained in the data from the student language model ("No" at 606), control circuitry 308 may execute a new search to identify a teacher language model related to the student language model at 602. If control circuitry 308 determines that at least a subset of the data from the teacher language model is not already contained in the data from the student language model ("Yes" at 606), control circuitry 308 may calculate a probability score at 608. In some embodiments, control circuitry 308 may determine the entire collection available in the teacher language model is not contained in the data from the student language model. The determination at 606 may be accomplished by any means considered by one skilled in the art to enable control circuitry 308 to be used by a plurality of devices with a plurality of processing and storage capabilities.

At 608, control circuitry 308 may calculate a probability score that the student language model may require less training if the data from the teacher language model is added to the student language model. In some embodiments, the probability score is calculated using a loss calculation. An example loss calculation formula may be:

$$\text{Loss} = \text{Average}\left(\rho \sum_i^j \text{Teacher Prediction Loss} + \sigma \sum_i^j \text{Training Loss(Student)}\right)$$

In some embodiments, the Average function can be replaced by any other aggregation such as a mean function, a harmonic mean function, or a cross entropy function where there may be probability distributions. The variable p may represent a teacher language model training time loss tunable weight, which may be adjusted based on how one skilled in the art may determine the probability score may be adjusted based on data in the teacher language model. Variable i represents a batch number and variable j represents an index in a batch to define the boundaries of the two loss probability sums determined from the plurality of data found in teacher and student language models. The variable a may represent a student language model training time loss tunable weight, which may be adjusted based on how one skilled in the art may determine the probability score may be adjusted based on data in the student language model. The application may utilize any form of loss calculation to determine the probability score that one skilled in the art may deem useful for determining whether the data in the teacher language model would reduce the training time of the student language model.

In some embodiments, control circuitry 308 may utilize a predetermined threshold that is used to compare probability scores, determined from loss calculations, to determine the probability that a teacher language model will reduce the training time of a student language model. If control circuitry 308 determines the probability score exceeds the threshold ("Yes" at 610), control circuitry 308 may add the subset of data from the teacher language model to the student language model at 612. If control circuitry 308 determines the probability score does not exceed the threshold ("No" at 610), control circuitry 308 may identify a new teacher language model related to the student language model at 602.

FIG. 7 is a flowchart representing illustrative process 700 for generating a notification to the user indicating there is data available to download to update the student language model, in accordance with some disclosed methods and embodiments. It should be noted that process 700 or any step thereof could be performed on, or provided by, any device shown in FIG. 3 and can incorporate various user interfaces (e.g., display of FIG. 3). For example, process 700 may be executed by control circuitry 308 (FIG. 3) of user equipment exemplified by computing device 300. In addition, one or more steps of process 700 may be incorporated into or combined with one or more steps of any other process or embodiment (e.g., starting at process block 404 in process 400 of FIG. 4, starting at process block 602 in process 600 of FIG. 6). In addition, FIG. 1 and FIG. 2 provide depictions of exemplary embodiments of the processes described herein.

At 702, control circuitry 308 may identify a teacher language model related to the student language model. In some embodiments, control circuitry 308 may identify a media content item to compare data to the student language model. In some embodiments, control circuitry 308 may access a teacher language model or a media content item using any of the devices or processes depicted in FIGS. 1-3. At 704, control circuitry 308 may compare data from the teacher language model to data from the student language model. In some embodiments, the comparison is accomplished using one or a combination of any of the comparison methods described in relation to FIG. 6. If control circuitry 308 determines that all of the data from the teacher language model is already contained in the data from the student language model ("No" at 706), control circuitry 308 may execute a new search to identify a teacher language model related to the student language model at 702. If control circuitry 308 determines that at least a subset of the data from the teacher language model is not already contained in the data from the student language model ("Yes" at 706), control circuitry 308 may generate a notification to the user at 708. The determination at 706 may be accomplished by any means considered by one skilled in the art to enable control circuitry 308 to be used by a plurality of devices with a plurality of processing and storage capabilities. At 708, control circuitry 308 may generate a notification to the user of a user device that is connected to the user profile that updated data is available for the student language model. In some embodiments, the notification appears as notification 124 of FIG. 1. It should be noted that the notification generated may incorporate any elements deemed necessary by one skilled in the art to encourage a user to interact with the notification.

If control circuitry 308 determines the user selected the notification in order to download the update data from the teacher language model to the student language model ("Yes" at 710), control circuitry 308 adds the subset of data from the teacher language model to the student language model at 712. If control circuitry 308 determines the user did not select the notification in order to download the update data from the teacher language model to the student language model ("No" at 710), control circuitry 308 identifies a new teacher language model related to the student language model at 702. In some embodiments, control circuitry 308 may save the update data identified in a queue for a user to download at a later date. In some embodiments, control circuitry 308 may remove the update data from the queue should the user download new teacher model data that already incorporates the update data that was previously identified.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method for generating a natural language understanding model based on a user input, the method comprising:
   generating a student language model from a request, wherein the student language model identifies a source language and a location;
   identifying a teacher language model, wherein the teacher language model comprises data related to the student language model;
   comparing data from the teacher language model and from the student language model;
   adding any data from the teacher language model not found in the student language model;
   searching a server for data related to the student language model;
   identifying one or more tags associated with different types of entities linked to media content items on a user device, wherein each media content item has a language tag; and
   in response to determining that the one or more identified tags does not match the source language in the student language model, searching for media content items with a matching language tag.

2. The method of claim 1, wherein generating the student language model further comprises:
   determining a current location of a user using data available on the user device;
   comparing the current location of the user to a plurality of stored locations;
   in response to determining the current location of the user does not match any of the plurality of stored locations, generating a request to generate the student language model; wherein the student language model identifies the source language and the current location of the user.

3. The method of claim 1, wherein comparing data from the teacher language model and from the student language model further comprises:
calculating a probability score associated with the teacher language model;
comparing the probability score to a threshold; and
in response to determining the probability score exceeds the threshold, adding a plurality of data in the teacher language model to the student language model.

4. The method of claim 3, further comprising:
in response to determining the probability score does not exceed the threshold, searching for additional teacher language models with related tags.

5. The method of claim 3, wherein the probability score is a loss calculation related to a predicted training time of the student language model.

6. The method of claim 1, further comprising generating a notification that provides a user with an indicator that, when selected, will download data to update the data from the student language model.

7. The method of claim 1, further comprising generating a notification that provides a user with an indicator that, when selected, will download data to update the data from the student language model with data from a related teacher language model.

8. The method of claim 1, further comprising:
associating a user profile with the request to generate the student language model; and
determining a plurality of user language preferences associated with a plurality of applications on the user device.

9. A system for generating a natural language understanding model based on a user input, the system comprising:
input/output circuitry configured to:
receive a request to generate a student language model;
control circuitry configured to:
generate the student language model from the request, wherein the student language model identifies a source language and a location;
identify a teacher language model, wherein the teacher language model comprises data related to the student language model;
compare data from the teacher language model and from the student language model;
add any data from the teacher language model not found in the student language model;
search a server for data related to the student language model;
identify one or more tags associated with different types of entities linked to media content items on a user device, wherein each media content item has a language tag; and
in response to determining that the one or more identified tags does not match the source language in the student language model, search for media content items with a matching language tag.

10. The system of claim 9, wherein the control circuitry configured to generate the student language model is further configured to:
determine a current location of a user using data available on the user device;
compare the current location of the user to a plurality of stored locations;
in response to determining the current location of the user does not match any of the plurality of stored locations, generate a request to generate the student language model; wherein the student language model identifies the source language and the current location of the user.

11. The system of claim 9, wherein the control circuitry configured to compare data from the teacher language model and from the student language model is further configured to:
calculate a probability score associated with the teacher language model;
compare the probability score to a threshold; and
in response to determining the probability score exceeds the threshold, add a plurality of data in the teacher language model to the student language model.

12. The system of claim 11, wherein the control circuitry is further configured to:
in response to determining the probability score does not exceed the threshold, search for additional teacher language models with related tags.

13. The system of claim 11, wherein the probability score is a loss calculation related to a predicted training time of the student language model.

14. The system of claim 9, wherein the control circuitry is further configured to generate a notification that provides a user with an indicator that, when selected, will download data to update the data from the student language model.

15. The system of claim 9, wherein the control circuitry is further configured to generate a notification that provides a user with an indicator that, when selected, will download data to update the data from the student language model with data from a related teacher language model.

16. The system of claim 9, wherein the control circuitry is further configured to:
associate a user profile with the request to generate the student language model; and
determine a plurality of user language preferences associated with a plurality of applications on the user device.

* * * * *